United States Patent
Ueda

(10) Patent No.: US 10,150,200 B2
(45) Date of Patent: Dec. 11, 2018

(54) GRINDING ROBOT SYSTEM

(71) Applicant: FANUC CORPORATION, Yamanashi (JP)

(72) Inventor: Tetsuji Ueda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 15 days.

(21) Appl. No.: 15/482,994

(22) Filed: Apr. 10, 2017

(65) Prior Publication Data
US 2017/0341200 A1 Nov. 30, 2017

(30) Foreign Application Priority Data
May 26, 2016 (JP) ................ 2016-104946

(51) Int. Cl.
| | |
|---|---|
| *B24B 27/04* | (2006.01) |
| *B24B 27/00* | (2006.01) |
| *B24B 49/00* | (2012.01) |
| *B25J 9/16* | (2006.01) |
| *B25J 11/00* | (2006.01) |

(52) U.S. Cl.
CPC .......... *B24B 27/04* (2013.01); *B24B 27/0084* (2013.01); *B24B 49/006* (2013.01); *B25J 9/1651* (2013.01); *B25J 11/0065* (2013.01); *G05B 2219/45058* (2013.01)

(58) Field of Classification Search
CPC .. B24B 27/0084; B24B 49/006; B25J 9/1615; B25J 11/0065; G05B 2219/45058
USPC ........................................................ 451/5
See application file for complete search history.

(56) References Cited

U.S. PATENT DOCUMENTS

| | | | |
|---|---|---|---|
| 5,077,941 A | | 1/1992 | Whitney |
| 5,299,389 A | * | 4/1994 | Yonaha .................. B25J 9/1684 451/11 |

(Continued)

FOREIGN PATENT DOCUMENTS

| | | |
|---|---|---|
| JP | 104-310360 A | 11/1992 |
| JP | H07-9334 A | 1/1995 |

(Continued)

OTHER PUBLICATIONS

Japanese Office Action dated Apr. 17, 2018, in connection with corresponding JP Application No. 2016-104946 (4 pgs., including English translation).

(Continued)

*Primary Examiner* — George Nguyen
(74) *Attorney, Agent, or Firm* — Maier & Maier, PLLC

(57) ABSTRACT

The occurrence of grinding unevenness is prevented even when the movement speed of a robot is changed. Provided is a grinding robot system including: a motor-driven grinder that performs grinding; a robot that grinds a grinding target by means of the grinder in a state in which one of the grinder or the grinding target is attached to a distal end thereof and is moved, and the other is set at a fixed position; and a control unit that controls the robot and the grinder, wherein the control unit calculates a rotational-speed command value for the grinder that changes according to the movement speed of the distal end of the robot and controls the rotational speed of the grinder on the basis of the calculated rotational-speed command value.

2 Claims, 4 Drawing Sheets

(56) References Cited

U.S. PATENT DOCUMENTS

| | | | | |
|---|---|---|---|---|
| 5,711,697 A * | 1/1998 | Taninaga | ............... | B24B 27/04 |
| | | | | 318/560 |
| 6,390,888 B1 * | 5/2002 | Amano | ............... | B24B 23/00 |
| | | | | 451/24 |
| 9,855,636 B2 * | 1/2018 | Naderer | ............... | B24B 49/006 |
| 9,969,085 B2 * | 5/2018 | Sugio | ............... | B25J 9/1651 |
| 2013/0317646 A1 * | 11/2013 | Kimoto | ............... | B25J 9/1651 |
| | | | | 700/250 |
| 2014/0113525 A1 * | 4/2014 | Chan | ............... | G05B 19/19 |
| | | | | 451/5 |

FOREIGN PATENT DOCUMENTS

| | | |
|---|---|---|
| JP | H07-164283 A | 6/1995 |
| JP | 2011-041992 A | 3/2011 |
| JP | 2011-218452 A | 11/2011 |

OTHER PUBLICATIONS

Search Report dated Apr. 12, 2018 in corresponding Japanese Application No. 2016-104946; 25 pages.

* cited by examiner

GRINDING ROBOT SYSTEM

CROSS-REFERENCE TO RELATED APPLICATIONS

This application is based on Japanese Patent Application No. 2016-104946, the contents of which are incorporated herein by reference.

BACKGROUND ART

Grinding robots for preventing over-grinding etc. by feeding back the load imposed on a grind motor that rotates a grinding stone have been conventionally known (for example, see PTL 1).

CITATION LIST

Patent Literature

{PTL 1} Japanese Unexamined Patent Application, Publication No. Hei 7-9334

SUMMARY OF INVENTION

Technical Problem

An object of the present invention is to provide a grinding robot system capable of preventing the occurrence of grinding unevenness even when the movement speed of the robot is changed.

Solution to Problem

According to one aspect, the present invention provides a grinding robot system comprising: a motor-driven grinder that performs grinding; a robot that grinds a grinding target by means of the grinder in a state in which one of the grinder or the grinding target is attached to a distal end thereof and is moved, and the other is set at a fixed position; and a control unit that controls the robot and the grinder, wherein the control unit calculates a rotational-speed command value for the grinder that changes according to the movement speed of the distal end of the robot and controls the rotational speed of the grinder on the basis of the calculated rotational-speed command value.

In the above-described aspect, the control unit may calculate the rotational-speed command value for the grinder on the basis of a movement-speed command value of the distal end of the robot instructed in an operation program of the robot.

In the above-described aspect, the control unit may be provided with a storage unit that stores a plurality of functions showing the relationship between the movement speed of the distal end of the robot and the rotational-speed command value for the grinder, may read an instructed function from the storage unit when the operation program is executed, and may calculate the rotational-speed command value for the grinder by using the read function.

The above-described aspect may further comprise a rotation-speed detecting unit that detects the rotation speed of the grinder or the rotation speed of a motor of the grinder, wherein the control unit may feed back the rotation speed detected by the rotation-speed detecting unit to control the rotational speed of the grinder.

DESCRIPTION OF EMBODIMENT

A grinding robot system 1 according to one embodiment of the present invention will be described below with reference to the drawings.

Figure 1:
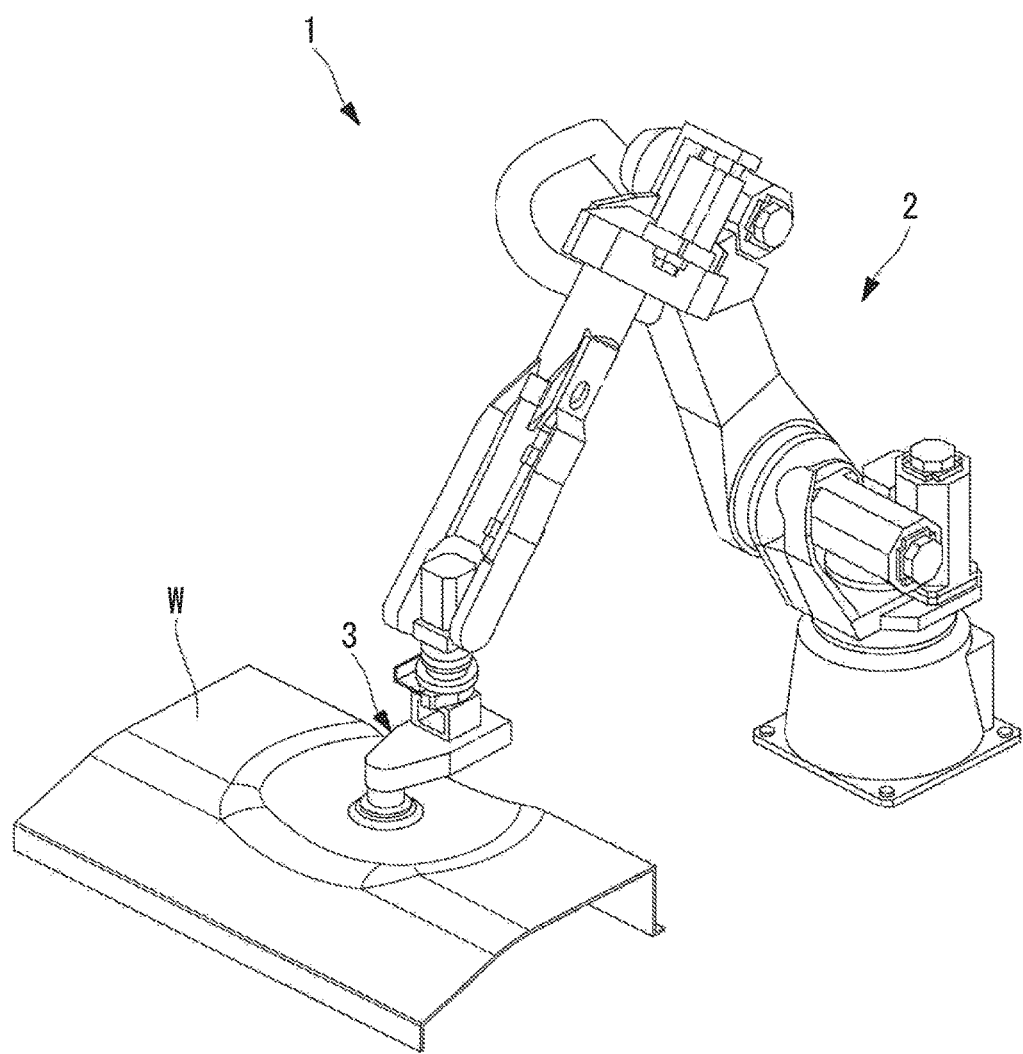
FIG. 1 is a view showing the overall configuration of a grinding robot system according to one embodiment of the present invention.
Figure 2:
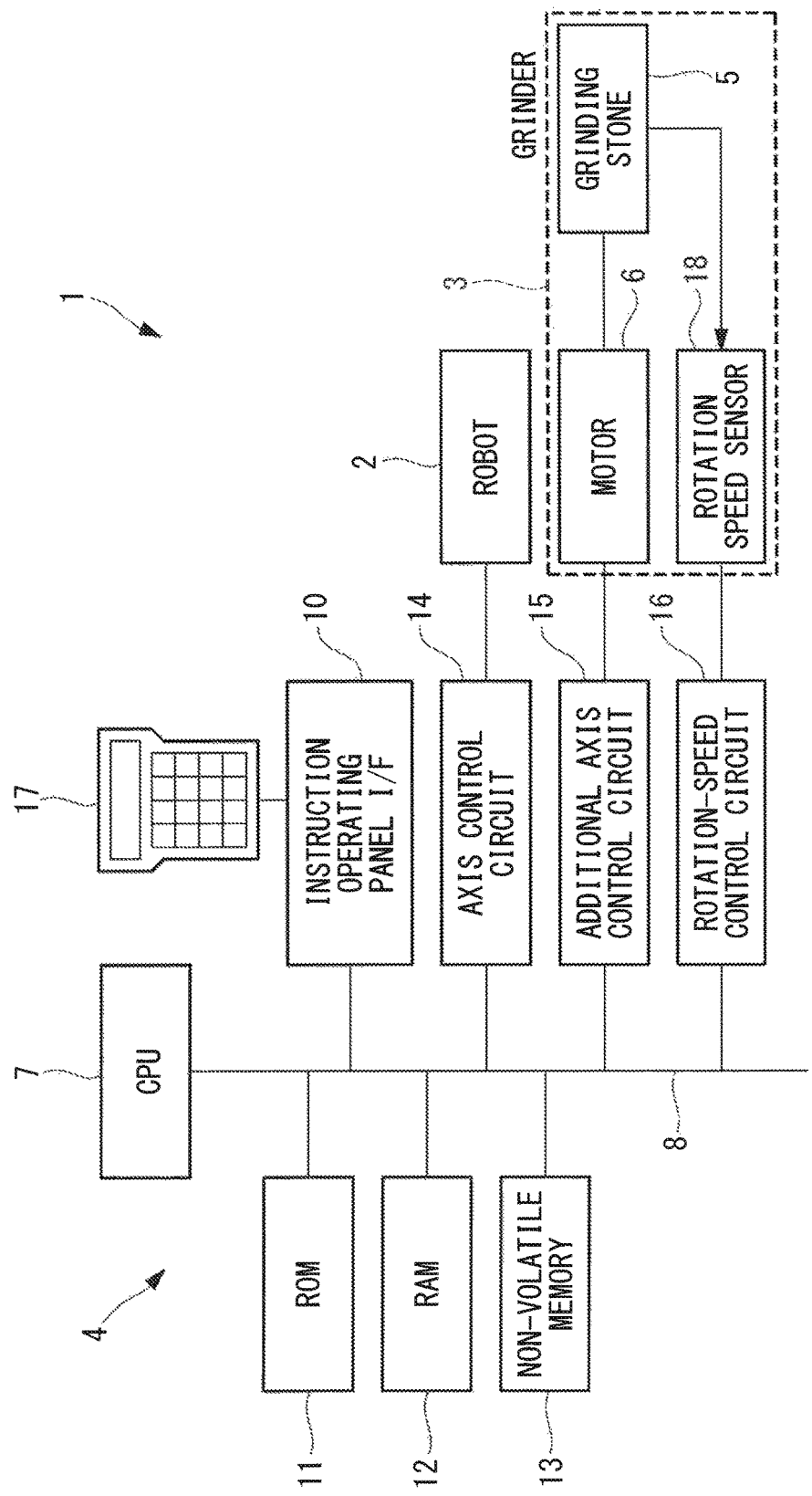
FIG. 2 is a block diagram for explaining a control unit of the grinding robot system shown in FIG. 1.

As shown in FIGS. 1 and 2, the grinding robot system 1 of this embodiment is provided with: a robot 2; a grinder 3 that is attached to a distal end of the robot 2; and a control unit 4 that controls the robot 2 and the grinder 3.

A workpiece W serving a grinding target to be ground by the grinder 3 is fixed at a fixed position away from the robot 2.

The robot 2 is, for example, a 6-axis articulated robot and can arbitrarily set the position and the orientation of the grinder 3, which is attached to the distal end thereof.

The grinder 3 is provided with a disk-shaped grinding stone 5 that grinds the workpiece W and a motor 6 that rotates the grinding stone 5 in the circumferential direction.

As shown in FIG. 2, the control unit 4 is provided with a CPU 7; and an instruction/operating panel I/F 10, a ROM 11, a RAM 12, a non-volatile memory (storage unit) 13, an axis control circuit 14, an additional axis control circuit 15, and a rotation-speed control circuit 16 that are connected in parallel, to a bus 8 connected to the CPU 7.

An instruction/operating panel 17 is connected to the instruction/operating panel I/F 10. The instruction/operating panel 17 is equipped with a display function, and a worker manually operates the instruction/operating panel 17 to create, modify, and register an operation program for the robot 2, to set various parameters, or to perform a playback operation of an instructed operation program, jog feeding, etc.

A system program that supports the basic functions of the robot 2 and the control unit 4 is stored in the ROM 11. Furthermore, the operation program for the robot 2 and relevant setting data that are instructed according to an application are stored in the non-volatile memory 13. The RAM 12 is used as a temporary storage area for data used for various types of arithmetic processing performed by the CPU 7.

Upon receiving a movement command that is generated through arithmetic processing (creation of a trajectory plan, interpolation and inverse transformation based thereon, etc.) for controlling the robot and feedback signals received from pulse coders (not shown) that are provided for respective axes, the axis control circuit 14 outputs torque commands to servo amplifiers (not shown) that move the respective axes of the robot 2.

The additional axis control circuit 15 controls the rotational speed of the grinding stone 5 in the grinder 3, which is attached to the distal end of the robot 2. The grinder 3 is provided with a rotation speed sensor (rotation-speed detecting unit) 18 that detects the rotation speed of the grinding stone 5.

The rotation-speed control circuit 16 calculates a rotational-speed command to be supplied to the additional axis control circuit 15 on the basis of a commanded speed of the distal end of the robot 2 that is instructed in the operation program and an output value of the rotation speed sensor 18.

Figure 3:
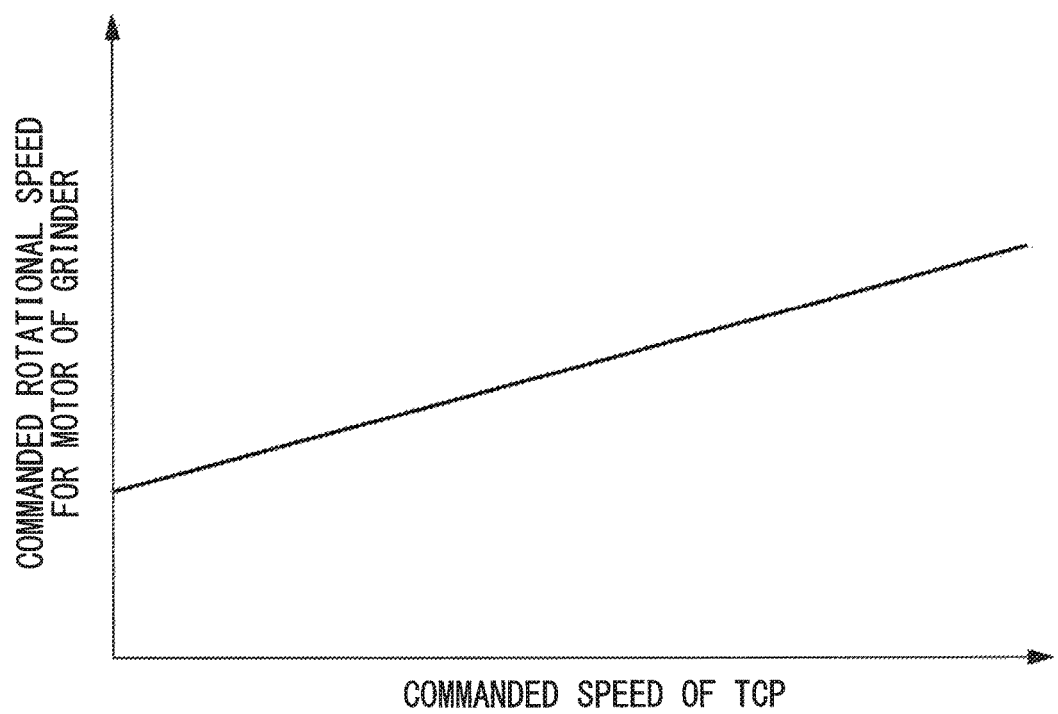
FIG. 3 is a graph showing an example function expressing the relationship between the commanded speed of a distal end of a robot provided in the control unit shown in FIG. 2 and the commanded rotational speed for a motor of a grinder.

Specifically, as shown in FIG. 3, the rotation-speed control circuit 16 stores, in the non-volatile memory 13, a function showing the relationship between the commanded speed (movement speed) of the distal end of the robot 2 and a commanded rotational speed (rotational-speed command value) for the motor 6 of the grinder 3, reads the stored function when the commanded speed of the distal end of the robot 2 instructed in the operation program is read, calculates a commanded rotational speed for the motor 6 of the grinder 3, and supplies it to the additional axis control circuit 15.

Here, an example of the commanded speed for the distal end of the robot 2 is a movement speed of a TCP (Tool Center Point) defined in the operation program. In this embodiment, for example, a contact point of the grinding stone 5 of the grinder 3 with the workpiece W may be defined as the TCP.

At the contact point of the grinding stone 5 of the grinder 3 with the workpiece W, a relative speed with respect to the workpiece W is caused due to the rotation of the grinder 3, and, when the robot 2 is moved according to the operation program, the TCP moves with respect to the workpiece W, and, as a result, even greater relative speed is caused.

Specifically, when the rotational speed of the grinding stone 5 is constant, if the TCP of the robot 2 is moved in the same direction as the direction of a relative speed caused due to the rotation of the grinding stone 5, the rotational speed of the grinder 3 is apparently increased; thus, by reducing the rotational speed of the grinding stone 5, it is possible to maintain a constant relative speed between the workpiece W and the grinding stone 5. In contrast to this, if the TCP of the robot 2 is moved in the opposite direction from the direction of a relative speed caused due to the rotation of the grinding stone 5, the rotational speed of the grinder 3 is apparently reduced; thus, by increasing the rotational speed of the grinding stone 5, it is possible to maintain a constant relative speed between the workpiece W and the grinding stone 5.

The rotation-speed control circuit 16 calculates a commanded rotational speed for the motor 6 of the grinder 3 such that the deviation between the calculated commanded rotational speed and the rotation speed of the grinding stone 5 detected by the rotation speed sensor 18 becomes zero.

The operation of the thus-configured grinding robot system 1 will be described below.

Figure 4:
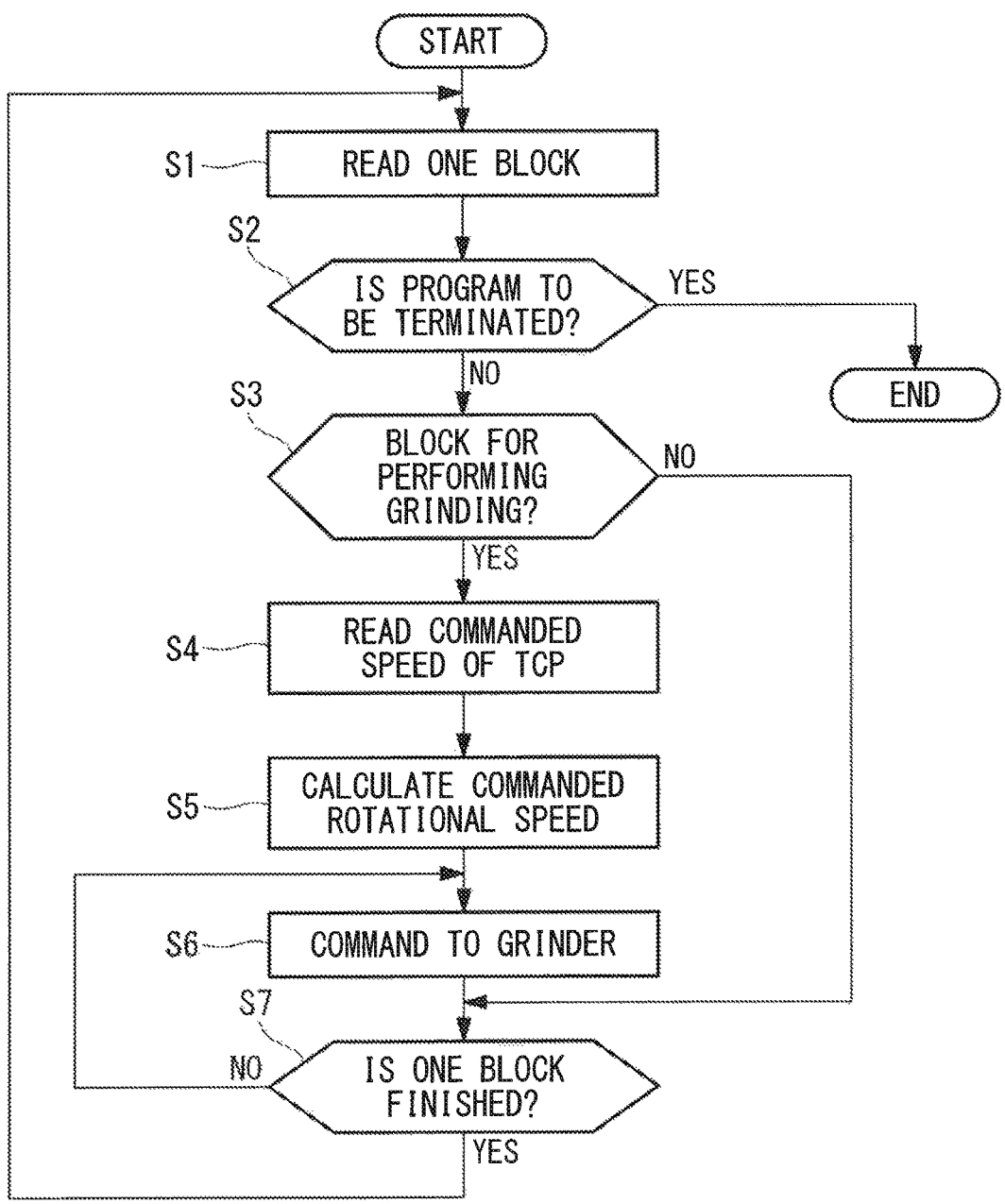
FIG. 4 is a flowchart for explaining the operation of the grinding robot system shown in FIG. 1.

In order to grind the workpiece W by using the grinding robot system 1 of this embodiment, as shown in FIG. 4, when the operation program is executed, first, one block of the operation program is read (Step S1), and it is determined whether the program is to be terminated (Step S2). If it is determined that the program is to be terminated, the operation is stopped and terminated.

If it is determined that the program is not to be terminated, it is determined whether the read block is a block for performing grinding (Step S3). If it is determined that the read block is a block for performing grinding, the commanded speed of the TCP of the robot 2 instructed in the operation program is read (Step S4), and a commanded rotational speed for the motor 6 of the grinder 3 is calculated in the rotation-speed control circuit 16 (Step S5).

The commanded rotational speed for the motor 6 of the grinder 3 calculated by the rotation-speed control circuit 16 is transmitted to the additional axis control circuit 15 via the bus 8, and the motor 6 of the grinder 3 is controlled (Step S6). Then, it is determined whether the operation for the one block has been finished (Step S7). If it is determined that the operation for the one block has not been finished, the process of Step S6 is repeated. If it is determined that the operation for the one block has been finished, the process from Step S1 is repeated.

In Step S3, if it is determined that the read block is not a block for performing grinding, the process of Step S6 is repeated until it is determined in Step S7 that the operation for the one block has been finished. In this case, because the read block is not a block for performing grinding, command outputting processing for the grinder 3 in Step S6 is not actually performed.

In this way, according to the grinding robot system 1 of this embodiment, when the robot 2 is made to move while the grinder 3 is made to rotate the grinding stone 5, because the rotation speed of the grinder 3 is controlled according to the movement speed of the TCP of the robot 2, there is an advantage that a change in the relative speed between the grinding stone 5 of the grinder 3 and the workpiece W is kept low, thereby making it possible to prevent the occurrence of grinding unevenness.

In this embodiment, although the commanded speed of the TCP instructed in the operation program is read, and a commanded rotational speed for the motor 6 of the grinder 3 is calculated, for each block of the operation program, instead of this, a commanded rotational speed for the motor 6 of the grinder 3 may be calculated for each instruction point of the operation program.

Although a linear function shown in FIG. 3 is adopted as the function of the commanded rotational speed for the motor 6 of the grinder 3 with respect to the commanded speed of the TCP, the function is not limited thereto, and a high-dimensional function may be adopted.

Although the rotation-speed control circuit 16 reads a single function stored in the non-volatile memory 13, instead of this, it is also possible to store a plurality of functions in the non-volatile memory 13 and to specify a function to be read, in the operation program. By selecting a different function depending on the type of the workpiece W and the grinding stone 5, the grinding condition, or the like, more-finely-textured grinding processing can be performed.

In this embodiment, although a description has been given of a case in which the grinder 3 is attached to the distal end of the robot 2, the workpiece W is fixed at a fixed position, and grinding is performed while the grinder 3 is moved, instead of this, the present invention may be applied to a case in which the workpiece W is attached to the distal end of the robot 2 or the workpiece W is gripped with a hand attached to the distal end of the robot 2, the grinder 3 is fixed at a fixed position, and grinding is performed while the workpiece W is moved.

As a result, the following aspect is read from the above described embodiment of the present invention.

According to one aspect, the present invention provides a grinding robot system comprising: a motor-driven grinder that performs grinding; a robot that grinds a grinding target by means of the grinder in a state in which one of the grinder or the grinding target is attached to a distal end thereof and is moved, and the other is set at a fixed position; and a control unit that controls the robot and the grinder, wherein the control unit calculates a rotational-speed command value for the grinder that changes according to the movement speed of the distal end of the robot and controls the rotational speed of the grinder on the basis of the calculated rotational-speed command value.

According to this aspect, when the control unit operates the robot, thereby moving the grinder or the grinding target that is attached to the distal end, the control unit calculates a rotational-speed command value for the grinder according to the movement speed of the distal end of the robot and controls the rotational speed of the grinder. Specifically, when the grinder is stopped with respect to the grinding target, the relative speed between the grinding stone of the grinder and the grinding target coincides with the circumferential speed of the grinding stone of the grinder; however, when the distal end of the robot is moved in the same direction as or in the opposite direction from the direction of the circumferential speed of the grinding stone of the grinder, because the relative speed between the grinding stone of the grinder and the grinding target increases or decreases with respect to the circumferential speed of the grinding stone of the grinder if the rotational speed of the grinder is constant, the grinding state fluctuates.

According to this aspect, even when the rotational speed of the grinder is changed according to the movement speed of the distal end of the robot, thus moving the distal end of the robot in the same direction as or in the opposite direction from the direction of the circumferential speed of the grinding stone of the grinder, it is possible to maintain the relative speed between the grinding stone of the grinder and the grinding target constant and to prevent the occurrence of grinding unevenness.

In the above-described aspect, the control unit may calculate the rotational-speed command value for the grinder on the basis of a movement-speed command value of the distal end of the robot instructed in an operation program of the robot.

By doing so, because the rotational-speed command value for the grinder is calculated by using the movement-speed command value of the distal end of the robot, which is instructed in the operation program, a means for detecting the movement speed of the distal end of the robot is not required, thus making it possible to easily control the rotational speed of the grinder and to prevent the occurrence of grinding unevenness.

In the above-described aspect, the control unit may be provided with a storage unit that stores a plurality of functions showing the relationship between the movement speed of the distal end of the robot and the rotational-speed command value for the grinder, may read an instructed function from the storage unit when the operation program is executed, and may calculate the rotational-speed command value for the grinder by using the read function.

By doing so, in giving an instruction in the operation program, it is possible to instruct a suitable function among the plurality of functions stored in the storage unit. When the operation program is executed, the control unit reads a function instructed in the operation program from the storage unit and controls the rotational speed of the grinder. Accordingly, it is possible to select the most suitable function depending on the type of the grinding stone of the grinder, the difference in pressing pressure, etc., thus making it possible to maintain a more constant grinding state and to prevent the occurrence of grinding unevenness.

The above-described aspect may further comprise a rotation-speed detecting unit that detects the rotation speed of the grinder or the rotation speed of a motor of the grinder, wherein the control unit may feed back the rotation speed detected by the rotation-speed detecting unit to control the rotational speed of the grinder.

By doing so, it is possible to accurately control the rotational speed of the grinder to be the calculated rotational speed and to prevent the occurrence of grinding unevenness.

The invention claimed is:

1. A grinding robot system comprising:
   a motor-driven grinder that performs grinding;
   a robot that grinds a grinding target by the grinder in a state in which one of the grinder or the grinding target is attached to a distal end of the robot and is moved, and another one of the grinder of the grinding target is set at a fixed position; and
   a control unit that controls the robot and the grinder,
   wherein the control unit is provided with a storage unit that stores a plurality of functions showing the relationship between movement speed of the distal end of the robot and rotational-speed command value for the grinder, and
   when an operation program of the robot is executed, the control unit reads the function from the storage unit on the basis of the movement speed of the distal end of the robot instructed in the operation program of the robot, calculates a rotational-speed command value for the grinder by using the read function, and controls the rotational speed of the grinder on the basis of the calculated rotational-speed command value.

2. A grinding robot system according to claim 1, further comprising a rotation-speed detecting unit that detects the rotation speed of the grinder or the rotation speed of a motor of the grinder,
   wherein the control unit feeds back the rotation speed detected by the rotation-speed detecting unit to control the rotational speed of the grinder.

* * * * *